United States Patent
van Rietschote et al.

(10) Patent No.: US 9,569,443 B1
(45) Date of Patent: Feb. 14, 2017

(54) METHOD AND APPARATUS FOR PROVIDING ACCESS TO DATA IN UNSUPPORTED FILE SYSTEMS AND STORAGE CONTAINERS

(75) Inventors: Hans van Rietschote, Sunnyvale, CA (US); Craig W Hobbs, Mountain View, CA (US); Tommi Salli, Mountain View, CA (US)

(73) Assignee: SYMANTEC CORPOARTION, Cupertino, CA (US)

(*) Notice: Subject to any disclaimer, the term of this patent is extended or adjusted under 35 U.S.C. 154(b) by 1985 days.

(21) Appl. No.: 11/864,533

(22) Filed: Sep. 28, 2007

(51) Int. Cl.
*G06F 17/30* (2006.01)

(52) U.S. Cl.
CPC .............. *G06F 17/30076* (2013.01)

(58) Field of Classification Search
CPC ........... G06F 9/455–9/45558; G06F 17/30076; G06F 17/30194; G06F 17/30233; G06F 17/30235; G06F 17/30238
See application file for complete search history.

(56) References Cited

U.S. PATENT DOCUMENTS

| | | | | |
|---|---|---|---|---|
| 5,218,697 | A * | 6/1993 | Chung | 709/230 |
| 5,689,701 | A * | 11/1997 | Ault et al. | |
| 6,356,915 | B1 * | 3/2002 | Chtchetkine | G06F 17/30235 707/823 |
| 6,484,309 | B2 * | 11/2002 | Nowlin et al. | 717/100 |
| 6,718,372 | B1 * | 4/2004 | Bober | 709/217 |
| 7,356,679 | B1 * | 4/2008 | Le et al. | 713/1 |
| 7,987,432 | B1 * | 7/2011 | Grechishkin et al. | 715/778 |
| 2003/0101189 | A1 * | 5/2003 | Lanzatella et al. | 707/100 |
| 2003/0115218 | A1 * | 6/2003 | Bobbitt et al. | 707/200 |
| 2004/0255048 | A1 * | 12/2004 | Lev Ran et al. | 709/249 |
| 2005/0177539 | A1 * | 8/2005 | Goodwin | G06F 17/30067 |
| 2005/0273486 | A1 * | 12/2005 | Keith, Jr. | 709/200 |
| 2006/0010433 | A1 * | 1/2006 | Neil | 717/138 |
| 2006/0218544 | A1 * | 9/2006 | Chakraborty et al. | 717/168 |
| 2007/0168478 | A1 * | 7/2007 | Crosbie | G06F 8/63 709/221 |
| 2008/0028401 | A1 * | 1/2008 | Geisinger | 718/1 |
| 2008/0082488 | A1 * | 4/2008 | Terrell | 707/3 |
| 2008/0154985 | A1 * | 6/2008 | Childs et al. | 707/204 |

OTHER PUBLICATIONS

"A General-Purpose Synthetic Filesystem," by Kell, Stephen. Dissertation, Christ's College (May 2005). Available at: http://www.cl.cam.ac.uk/~srk31/research/prehistory/dissertation-srk31.pdf.*
"Designing and Implementing a File System," by Rubli, Martin (Feb. 2006). Available at: http://rubli.info/academia/projects/TwizelFS/TwizelFS.pdf.*
"Develop your own filesystem with FUSE," by IBM developerWorks (Feb. 26, 2006). Available at: http://www.ibm.com/developerworks/library/l-fuse/.*

(Continued)

*Primary Examiner* — Alexey Shmatov (57) ABSTRACT

A method, apparatus and system for providing access to data comprising launching an image of a virtual machine, determining a file system or a storage container being unsupported by an operating system coupled to the virtual machine, mapping the file system or the storage container onto the operating system and accessing data within the file system or the storage container through the operating system.

9 Claims, 4 Drawing Sheets

(56) References Cited

OTHER PUBLICATIONS

"Fun with FUSE," by Appaiah, Kumar (Jan. 2007). Available at: http://linuxgazette.net/134/appaiah.html.*

"The Kernel," by the User-mode Linux Kernal Home Page. Internet Archive capture from Jul. 16, 2006. Available at: http://web.archive.org/web/20060716073700/http://user-mode-linux.sourceforge.net/kernel.html http://user-mode-linux.sourceforge.net/old/kernel.html.*

"Fuse-NT: Userspace File Systems for Windows NT," by Driscoll et al. Available at: http://citeseerx.ist.psu.edu/viewdoc/summary?doi=10.1.1.131.3896 PDF Creation date: May 14, 2007.*

"Linux: Mount a Windows file system from Linux," by Tech on the Net (wayback machine date from Jul. 8, 2006). Available at: https://web.archive.org/web/20060708211024/http://techonthenet.com/linux/mount.php.*

"Lighting the FUSE," by Smith, Roderick. In: LINUX Magazing (Aug. 17, 2006). Available at: http://www.linux-mag.com/id/2566/.*

"Fuse Extension," by Gallesio, Erick. In: stklos.net (Jan. 15, 2006). Available at: http://www.stklos.net/Doc/extensions/fuse/fuse.html.*

"FUSE—Implementing Filesystems in User Space," by Corbet. (2004). Available at: https://lwn.net/Articles/68104/.*

"Loopback Mounts," in Unix Power Tools $3^{rd}$. ed., by O'Reilly & Associates (2003). Available at: http://docstore.mik.ua/orelly/unix3/upt/ch44_07.htm.*

\* cited by examiner

METHOD AND APPARATUS FOR PROVIDING ACCESS TO DATA IN UNSUPPORTED FILE SYSTEMS AND STORAGE CONTAINERS

BACKGROUND OF THE INVENTION

Field of the Invention

The present invention generally relates to data storage systems. More particularly, the present invention relates to a method and apparatus for providing access to data in unsupported file systems and storage containers.

Description of the Related Art

An operating system (OS) normally includes one or more file systems. The file system provides a structure for storing and organizing computer files and the data they contain to make the data easy to find and access them. A file system is a set of abstract data types that are implemented for the storage, hierarchical organization, manipulation, navigation, access and retrieval of data.

Owing to the fact that all operating systems include support for variety of file systems, operating systems interact with the supported file systems. Specifically, operating systems have drivers or special functions for interaction with the supported file systems. For example, Microsoft Windows NT, 2000 and XP have a default file system Application Programming Interface (API) known as a file system driver for the NTFS, FAT and FAT32 file systems. File system drivers enable the operating system to interface with the file system. The OS usually provides abstractions for accessing different file systems transparently to users, and in this sense it is analogous to device driver APIs that provide abstracted access to hardware.

In certain applications, virtual machines help run file systems on a guest OS that are unsupported by the primary OS. However, certain file systems simply cannot be accessed by popular/normal operating systems, such as Windows or Mac OS. For example, esoteric (or new) file systems, such as FLICKRFS, GMAILFS, S3FS, VERSIONING FILE SYSTEMS and VERITAS File Systems known as VxFS, can only be made accessible to an OS through the use of OS-specific file system development tools or software development kits (SDKs). Besides, networks comprising numerous servers, clients and storage devices have difficulty accessing (reading/writing file data) the data mounted by the unsupported file systems. In particular, these networks cannot provide file-level access to the data for the enterprise through a seamless network shared file system because of the unsupported file systems. These are some of the major problems faced.

Typically, storage containers are devices that store data in arrays of optical or magnetic disk drives and may be online at remote locations with respect to a user's computer. In some applications, esoteric (e.g., unsupported or new) storage containers suffer from similar problems as the unsupported file systems. Specifically, popular/normal operating systems do not understand the format or arrangement of the data blocks in the unsupported storage containers and cannot access the data (read/write blocks). To mitigate such problems, operating systems need a dedicated device driver written for the OS-specific driver model. This in turn implies that there has to be separate sets of codes for different versions or distributions of each OS. For example, one set of code has to be written and maintained for WINDOWS, another one for MAC OS, a third for LINUX and so on.

However, even with good cross-platform coding practices using portable languages (or platform-independent languages) it is still necessary to write OS-specific code and conduct quality analysis (QA) on every version for every OS. This is owing to the fact that there is a possibility of differences in the specific compilers and absence of runtime library routines on all platforms or semantics and inter-component interactions specific to each platform. For instance, even a language such as JAVA supposedly designed to be portable has not achieved that objective—the old adage "write once, debug everywhere" still applies.

Accordingly, there is a need in the art for method and apparatus for providing access to data in unsupported file systems and storage containers.

SUMMARY OF THE INVENTION

Embodiments of the present invention comprise a method and apparatus for providing access to data. In one embodiment, the method and apparatus comprises launching an image of a virtual machine, determining a file system to be unsupported by an operating system coupled to the virtual machine, mapping the unsupported file system onto the operating system and generating a shared network file system accessible by the operating system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include,"

"including," and "includes" mean including, but not limited to. Further, the word "a" means "at least one", and the word "plurality" means one or more, unless otherwise mentioned.

DETAILED DESCRIPTION

The present invention is generally directed towards a method, apparatus and system for providing access to data in unsupported file systems and storage systems (also referred to as storage containers).

Figure 1:
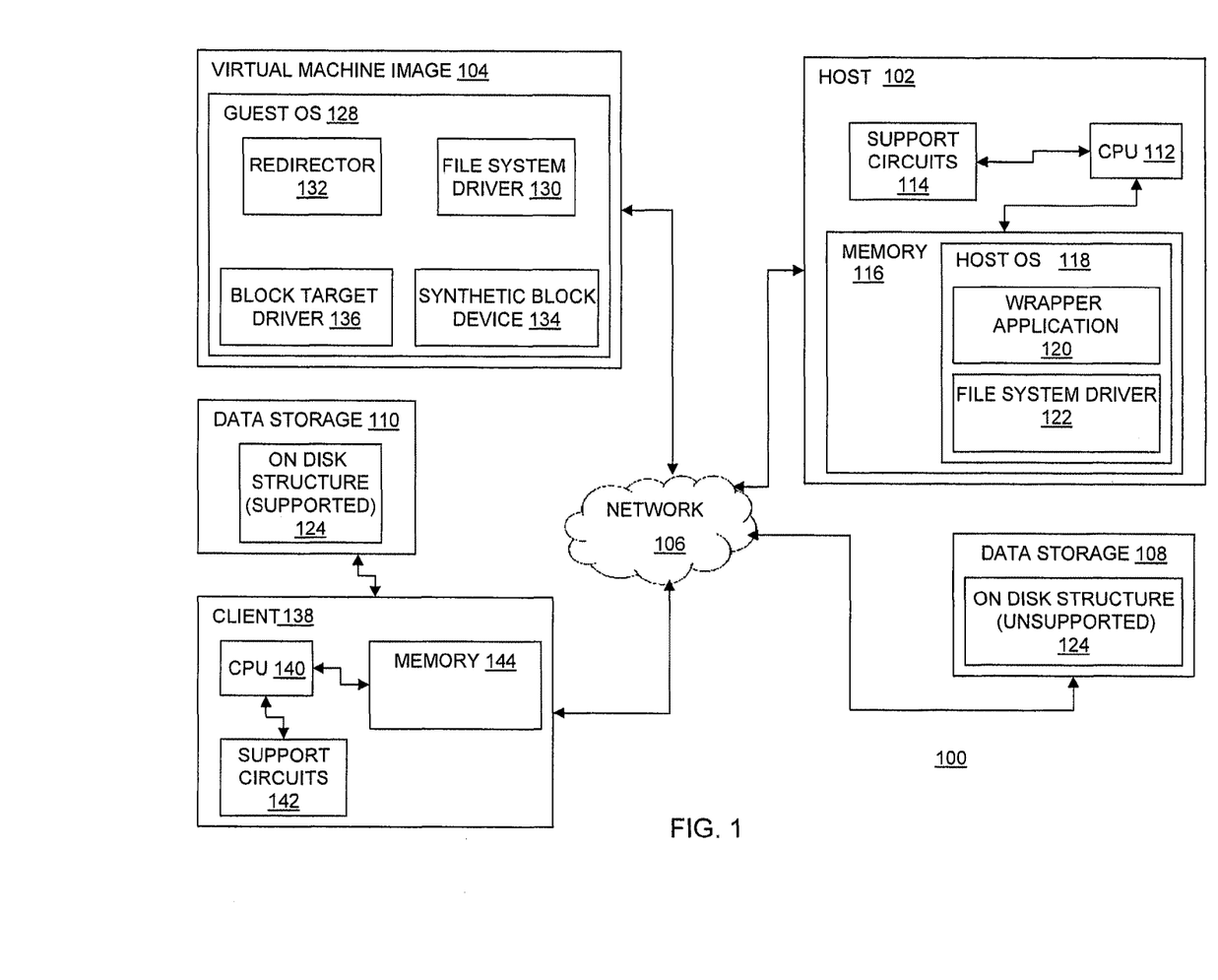
FIG. 1 is a block diagram of various embodiments of a system for providing access to data in unsupported file systems and storage containers, in accordance with at least one embodiment of the present invention.

FIG. 1 is a block diagram of a system 100 for providing access to data in unsupported file systems and storage containers in accordance with at least one embodiment of the present invention.

The system 100 comprises a host 102, a virtual machine image 104, a data storage device 108 and a client 138, each coupled through a network 106. Alternatively, the virtual machine image 104 may be stored within a memory of the host 102.

The host 102 is a computing device comprising a central processing unit (CPU) 112, support circuits 114 and a memory 116. The CPU 112 may comprise one or more commercially available microprocessors or microcontrollers that facilitate data processing and storage. The support circuits 114 facilitate operation of the CPU 112 and comprise at least one of clock circuits, power supplies, input/output circuits, and the like. The memory 116 comprises at least one of read only memory (ROM), random access memory (RAM), disk drive storage, optical storage, removable storage, and the like. The memory 116 further comprises a host operating system 118.

The client 138, includes a central processing unit (CPU) 140, various support circuits 142 and a memory 144. The CPU 140 may comprise one or more commercially available microprocessors or microcontrollers that facilitate data processing and storage. The support circuits 142 facilitate operation of the CPU 140 and include at least one of clock circuits, power supplies, cache, input/output circuits, and the like. The memory 144 includes a read only memory, random access memory, disk drive storage, optical storage, removable storage, and the like.

The data storage container 108 includes blocks of data organized by an on-disk structure 126. The data storage container 108 may include at least one disk drive coupled to the on-disk structure 126. The data storage container 108 may also be a block device or a block special file (e.g., a hard drive, a hard drive partition, a random access memory, a CD-ROM drive, or any other physical resource in which data is exchanged in the form of blocks). In one embodiment, the data storage container 108 is a network storage device on the network 106 (e.g., a Network-Attached Storage). In another embodiment, the data storage container 108 may be an online storage resource attached to a remote server (e.g., AMAZON S3) and coupled to the client 138 and the host 102 through the network 106.

The on-disk structure 126 is a file system with support for access control lists, record-oriented I/O, remote network access and file versioning. In one embodiment, the on-disk structure 126 represents the allocation of the data within the data storage container 108. The on-disk structure 126 may be a hierarchical file system having directories of data files, allocation tables and/or configuration files. The on-disk structure 126 may be used to access and store blocks of data in the data storage container 108. As such, the on-disk file structure 126 may perform similar functions as any file system mounted on the data stored in the data storage container 108.

Similarly, the data storage container 110 comprises blocks of data mounted by an on-disk structure 124 (e.g., a file system). The data storage container 110 may also be a block device or a block special file (e.g., a hard drive, a hard drive partition, a random access memory, a CD-ROM drive, or any other physical resource in which data is exchanged in the form of blocks).

In one embodiment, the data storage container 110 is locally coupled to the host 102 (e.g., a local hard drive). Alternatively, the data storage container 110 is a network or online storage resource similar to various embodiments of the data storage container 108.

In another embodiment, the on-disk structure 124 is supported by the host operating system 118. In this embodiment, the host operating system 118 cooperates with the file system driver 122 to read the supported on-disk file structure 124 on a local block device such as the data storage container 110. Accordingly, the file system driver 122 is a native file system driver for the on-disk structure 124. In yet another embodiment, the host operating system 118 includes native block device drivers for enabling block-level access (e.g., read and write block operations) to data stored in the data storage container 110.

A file system is a method of organizing and storing computer files. The file system may be used to retrieve file data from a plurality of storage devices. For example, the DOS, WINDOWS, OS/2, MACINTOSH and UNIX-based operating systems all have file systems in which files are placed somewhere in a hierarchical (tree) structure. A file is placed in a directory (folder in Windows) or subdirectory at the desired place in the tree structure. File systems may use a data storage device, such as a hard disk or CD-ROM, to maintain the physical location of the file data.

The file data may be accessed by the host 102 or the client 138 by acting as clients for a network protocol, such as Network File System Protocol (NFS), Server Message Block (SMB) or PLAN 9 FILE SYSTEM Protocol (9P) clients, or they may be virtual and exist only as an access method for virtual data, such as PROCESS FILE SYSTEM (procfs). Accordingly, the host operating system 118 operates with one or more file systems (e.g., represented by drive letters) that may also be visible to the client 138. In one or more embodiment, the file systems might be native local drives, file systems on shared network file systems and synthetic file systems presented as block devices (e.g., emulated as block devices).

Generally, a file system is not supported by an operating system if a specific file system driver is not available for the operating system. An "unsupported file system" may be an unsupported on-disk structure for which no file system driver specifically written for the operating system exists. Furthermore, a storage container is not supported by an operating system if a specific block device driver is not available for the operating system. An "unsupported storage container" may be block device or a block protocol for which no device driver specifically written for the operating system exists.

In accordance with one or more embodiments of the present invention, the host operating system 118 does not include a specific file system driver for the on-disk structure 126. Accordingly, the host operating system 118 cannot access data associated with the on-disk structure 126. As such, the on-disk structure 126 is an unsupported file system from the perspective of the host 102.

In another embodiment, the host operating system 118 does not include a specific block device driver for the data storage container 108. Accordingly, the host operating system 118 cannot access data stored within the data storage container 108. As such, the data storage container 108 is an unsupported storage container from the perspective of the host 102.

Generally, the virtual machine image 104 is a computer image comprising device drivers, operating system files, various data and a number of technologies for virtualizing hardware and software of the host 102 (e.g., the host operating system 118, the CPU 112 and the like). The virtual machine generated by executing the virtual machine image 104 is coupled to the data storage container 108. The data storage container 108 includes multiple blocks of data that are inaccessible to the host operating system 118.

The virtual machine image 104 includes a guest operating system 128. The guest operating system 128 includes a file system driver 130, a redirector 132, a synthetic block device 134 and a block device driver 136. The host 102 launches the virtual machine image 104 to execute a virtual machine. Accordingly, the guest operating system 128 starts running in a virtual environment on top of the host operating system 118 (e.g., logically in an architecture in accordance with one or more embodiments of the present invention, such as a WINDOWS architecture).

Generally, the virtual machine refers to software that creates a virtualized environment between the computer platform and its operating system, so that the end user can operate software on an abstract machine. The virtual machine allows applications written for one OS to be executed on a machine which runs a different OS or provide execution "sandboxes", which provide a greater level of isolation between processes than is achieved when running multiple processes on the same instance of an OS. Another use is to provide multiple users the illusion of having an entire computer, one that is their "private" machine, isolated from other users, all on a single physical machine. Another advantage is that booting and restarting a virtual machine is much faster than a physical machine, since it may be possible to skip tasks such as hardware initialization.

The virtual machine provides access to data (e.g., file-level or block-level) in an unsupported file system or an unsupported storage container. Logically, the virtual machine operates between the unsupported file system or the unsupported storage container and the host 102 (or the client 138) desiring access to data associated with (e.g., organized by) the unsupported file system (e.g., the on-disk structure 126) or stored within the unsupported storage container (e.g., the data storage container 108).

The network redirector 132 (or network file redirector) refers to an operating system driver that sends data to and receives data from a remote device. The network redirector 132 provides mechanisms for locating, opening, reading, writing, and deleting files and submitting print jobs. The network redirector 132 provides application services, such as named pipes and mail slots. When an application needs to send or receive data from a remote device, the application sends a call to the redirector. The redirector provides the functionality of the Application layer and Presentation layer of the Open Systems Interconnection (OSI) model. For example, in Microsoft Networking, the network redirectors are implemented as Installable File Systems (IFS).

The block device target driver 136 generally, is an end point of a session controlled by a network block protocol, such as ISCSI as described above for a corresponding initiator on the host computer 102. A block device (e.g., the synthetic block device 134) is presented to the host operating system 118 in accordance with one or more embodiments of the present invention. As such, the host operating system 118 accesses data stored in the data storage container 108 using the block device target driver 134.

The virtual machine image 104 is generated and implemented in a manner such that it enables access to an unsupported file system or an unsupported storage container. In one embodiment, access to the unsupported file system or the unsupported storage container is achieved by modifying registry settings or other management interfaces on the host operating system 118 to present the unsupported file system or the unsupported storage container as a Windows mapped drive.

In one or more embodiments involving a file system not supported by the host operating system 118 but supported by the guest operating system 128, the virtual machine maps the unsupported file system onto the host operating system 118 via the network redirector 132, such as NETWORK FILE SYSTEM (NFS) or COMMON INTERNET FILE SYSTEM (CIFS) service, to present the unsupported file system in a format natively supported by the host operating system 118 (e.g., the shared network file system). For example, the file system driver 130 operates with the on-disk structure 126, which is a file system native to the guest operating system 128. The host operating system 118 mounts the shared network file system over the network 106 from the network redirector 132, which accesses data in the data storage container 108 through the "native" file system driver 130.

In one embodiment, the guest operating system 128 does not support the file system (e.g., the on-disk structure 126), in which case the file system driver 130 is a custom driver that presents the on-disk structure 126 as a standard file system via standard network file serving technologies (e.g. CIFS or NTFS) as one or more embodiments of the network redirector 132. According to one embodiment, the file system driver 130 synthesizes a file system supported by the host operating system 118 from the unsupported on-disk structure 126. Alternatively, the data storage container 108 may be a completely nonstandard, non-block structured storage device or service for which the file system driver 130 is a custom application that presents the data as a supported file system (e.g., supported by the host operating system 118) for the guest operating system 128 to serve to the host operating system 118. For example, the non-block structured storage device or service includes the Amazon S3 file system or the Google Gmail file system, as described below.

In one embodiment, the virtual machine includes an application configured to support the file system driver 130. The application presents an unsupported file system (e.g., the on-disk structure 126) as a file system supported by guest operating system 128 for which standard network file sharing services are employed to enable access for the host operating system 118. The application translates access functions from the shared network file system onto the unsupported file system. In one or more embodiments, the application makes the on-disk structure 126 appear to be supported by the guest operating system 128 and/or the host operating system 118 using FILESYSTEM IN USER-SPACE (FUSE). FUSE is used to build mapping functions for unsupported file systems. Here, the virtual machine must use the application as an intermediate between the host 102 and the unsupported file system. In yet another embodiment, the virtual machine also maps block read/write requests from the host 102 against the unsupported storage container through the FUSE-built application within the virtual machine.

In one embodiment, the application synthesizes a file system that is supported by the host operating system based on the unsupported file system. The synthesized file system directly maps the requests received from the host operating system 118 to actions against the unsupported file system. In one embodiment, the application synthesizes the on-disk structure 126 in order to present the shared network file system to the host operating system 118 via the network redirector 132 (e.g., using a network file system protocol such as NFS or CIFS).

According to one embodiment where the unsupported file system is also not natively supported by the guest operating systems 128, the approach taken to bridge the unsupported file system to the host operating system 118 would be to create a modified file server (e.g., CIFS, SAMBA, NFS, DIRECT ACCESS FILE SYSTEM (DAFS) and the like).

In one or more embodiments involving the unsupported storage containers, the virtual machine maps the unsupported storage container onto the host operating system 118 via a network block protocol as the block target driver 136 (e.g., INTERNET SMALL COMPUTER SYSTEM INTERFACE (iSCSI), FIBRE CHANNEL OVER INTERNET PROTOCOL (FCIP) or Advanced Technology Attachment over Ethernet (AOE)) to present the unsupported storage container 108 as a block device target (e.g., the synthetic block device 134) for the host operating system 118.

The host operating system 118 communicates block-level operations (read or write operations) to the block device target through the block target driver 136. In one embodiment, the host operating system 118 uses the file system driver 122 to read from or write to the synthetic block device 134 via the block target driver 136. The synthetic block device 134 is generated by the virtual machine using various methods for synthesizing or emulating a block-structured device with an on-disk structure supported by the host operating system 118.

Specifically, the host operating system 118 sends a request (read/write request) to the virtual machine via the block protocol. The virtual machine maps the request onto the unsupported file system or the unsupported storage container into a form operable by the unsupported file system or the unsupported storage container. In one embodiment, the block target driver 136 communicates the request to the synthetic block device 134. The synthetic block device 134 receives the request from the host operating system 118 and translates the request into a request recognizable by the data storage container 108 (unsupported) and/or the on-disk structure 126 (unsupported). Accordingly, the data storage container 108 or the on-disk structure 126 performs the request for the host operating system 118.

In operation, when the virtual machine receives a read or write request, the block target driver 136 interacts with a FUSE-like facility to call an embodiment of the application with the parameters of the request. The request parameters comprise number of blocks to read or write at some block offset. The application then maps the block range to the appropriate chunk in the online store. Further, for a read request the application fetches the appropriate blocks from the online store by performing compression, encryption, and/or sparse processing as needed and returns the data to the block target driver (e.g., iSCSI target) for transmission to the host 102. With respect to a write request, the data received from the host 102 is written to the online store after appropriate processing. In one embodiment, the application 130 can maintain a local cache of the blocks to improve performance.

In one embodiment, the virtual machine is not aware of the file system in the unsupported storage container and perhaps does not even support the file system. The virtual machine performs block-level volume management functions, such as compression, encryption, or dealing with a storage container having sparse allocation features, but is not aware of the contents of the blocks passing through the virtual machine.

In other embodiments involving block storage, the virtual machine creates the synthetic block device 134 either from the file system not supported by the host operating system 118 or from the unsupported storage container 108 with the on-disk structure 126 that is not supported by the host 102. In such embodiments, the virtual machine responds to block read requests against the synthetic storage container by delivering the blocks containing file data or meta-data as if the synthetic storage container contained a host-supported file system. On the other hand, the virtual machine responds to block write requests by updating file data or file system meta data in the unsupported file system or the storage container.

In one embodiment, the synthesized block device 134 includes a file system supported by the host operating system 118 that is synthesized from the on-disk structure 126, which is not supported by the host operating system 118. The virtual machine synthesizes the on-disk structure 126 so that is appears as a host-supported file system. The virtual machine maps the on-disk structure 126 to the block structure and translates block read/write commands from the host 102 to appropriate actions on the on-disk structure 126. The virtual machine supports and implements the file system presented to the host operating system 118 as well as the on-disk structure 126. When the host operating system 118 requests a meta-data block, the guest operating system must provide a block containing meta-data for the synthetic file system. Whereas, when the host 102 writes a metadata block, the guest must look at the new metadata and reflect the changes against the unsupported file system.

In some embodiments, block-level access to the synthetic storage container, (e.g., LINUX and iSCSI targets). The FUSE-like user-mode code, however, is different. By way of example only, and without limitation, a File Allocation Table (FAT32) file system is presented on MASTER BOOT RECORD (MBR) formatted volume to the host 102. The file system meta-data structures may be built dynamically during operation of the host operating system 118.

In operation, the virtual machine receives an out-of-band request to create a volume from an unsupported file system X. The guest accesses file system X (fsX) using an appropriate mechanism. The Master Boot Record (MBR) is the first piece of metadata to be created. The MBR, among other things, contains the partition table that describes the volume. The guest needs to synthesize a partition of appropriate size and type. In certain embodiments, if fsX is an actual file system, the parameters of fsX are used to create an appropriate partition. Otherwise, it is necessary to traverse fsX to understand an appropriate partition layout.

In some embodiments, the virtual machine creates the metadata describing the partition subsequent to creation of the metadata for the MBR. This contains pointers to the FAT and the directory structure. The fsX file system is traversed to build the directory structure, and for filling the FAT entries, as appropriate for the size of the file, for each file. It must be noted here that for each FAT entry that represents the file data, the guest has a map to the file and the offset within the file. Further, the file data is not moved into the guest but the synthetic FAT maps every block of file data in the fsX.

Furthermore, the block target driver makes the disk visible to the host 102 after the virtual machine creates the metadata. In use, in some embodiments of the invention, the host 102 first requests to read the MBR, so the guest returns the synthetic home block. The guest looks at any writes to the metadata and maps those to appropriate fsX actions. For example, adding an entry to a directory block, allocating some FAT entries and writing to those FAT offsets are interpreted as creating a file in the fsX. As precautionary measures, some actions on meta-data are prohibited, or are subjected to special handling. For example, formatting the synthetic storage container, setting the dirty bit, and the like. In addition, the application reads or writes file data by determining from the block offset of the read/write request which FAT entry represents that storage location. Further, the application from the FAT information determines the file and an offset within that file to access.

The term "FUSE" refers to a free UNIX kernel module that allows non-privileged users to create their own file systems without the need to write any kernel code. This is achieved by running the file system code in user space, while the FUSE module only provides a "bridge" to the actual kernel interfaces. FUSE is particularly useful for writing virtual file systems. Virtual file systems do not actually store data themselves. They act as a view or translation of an existing file system. In principle, any resource available to FUSE implementation can be exported as a file system. For example, some of the possible applications are SECURE SHELL FILESYSTEM (SSHFS) (i.e. a file system that provides access to a remote file system through SECURE SHELL (SSH)), GMAILFS (i.e. a file system that stores data as mail in GMAIL), ENCFS (i.e. an encrypted virtual file system), FLICKRFS (i.e. presents a collection of photos stored on FLICKR appear as a file system), CAPTIVE NTFS, NTFSMOUNT and NTFS-3G (i.e. file systems that enable access to NTFS file systems) and the like.

The wrapper application 120 refers to a program that precedes or frames main data or program that sets up another program so that it can run successfully. Specifically, the wrapper application 120 is a program or script that sets the stage and makes possible the running of another program. The wrapper application 120 accompanies resources or other software for the purposes of improving convenience, compatibility, or security. For example, the wrapper application 120 is used to compress and encrypt software that is sold over the Internet. The wrapper application 120 is also used to make electronic data interchange (EDI), which is a decades-old electronic commerce standard compatible with the Internet.

The wrapper application 120 residing within the host 102 initializes and commences the virtual machine 128. The wrapper application 120 cooperates with the virtual machine 128 to present a shared network file system 142 to the host 102. In one embodiment, the wrapper may establish values for file system parameters. In certain embodiments, the wrapper application 120 may be coupled to a hypervisor, an application that monitors the virtual machine 128. The wrapper application 120 converts the virtual machine image 104 for one virtual machine into another virtual machine, thereby providing virtualization solution independent of the type of virtual machine used.

Alternatively, the host 102 includes the guest operating system 128 and the virtual machine image 104 in accordance with one or more embodiments of the present invention. The guest operating system 128 is running on the virtual machine. An unsupported file system is stored on a partition within the memory 110. The host 102 cannot access file data represented by the unsupported file system because dedicated file system drivers for the unsupported file system 126 are not available for the host operating system 112. In one embodiment, the guest operating system 128 supports (e.g., natively) the virtual machine created by the virtual machine image 104 maps the unsupported file system onto the host operating system 118 and generates a shared network file system, which is accessible by the host operating system 118.

The unsupported file system may be stored in a variety of places, such as on local network server, on the internet in online mode, on virtual disks on the host 102 accessed by the virtual machine, on one or more partitions of block storage device accessed through the virtual machine, on supported block protocol, such as iSCSI, and the like. For example, in some scenarios the virtual machine is LINUX client running the VERITAS FILE SYSTEM (VxFS). In here, the mounted VxFS is served to the guest using the SAMBA or NFS file serving services included in the LINUX operating system. In such scenarios. In such scenarios, VxFS access is provided to WINDOWS and MAC OS hosts 102 without any code development required for the host operating systems 118 even in the case where the VxFS is located on a raw partition on one of the physical disks attached to the host 102.

In certain embodiments, LINUX is used as an example an operating system running within the virtual machine. Here, use is made of SAMBA/CIFS as the network redirector service; however use of other network file systems, such as NFS, DAFS and the like are also applicable. By way of example, and in no way limiting the scope of the present invention, although one embodiment uses FUSE as the bridge to access the unsupported file system and map it to the current SAMBA, other embodiments may use any other file system access code implemented in user mode (as in FUSE) or in kernel mode is also possible. FUSE bindings are used to write the unsupported file system access routines in a high level language running in user space. The FUSE bindings map all the PORTABLE OPERATING SYSTEM INTERFACE (POSIX) file system access functions, such as MKDIR, RMDIR, MKNOD, UNLINK, READ, WRITE, RENAME, SYNC, GETATTR, CHMOD, CHOWN, and all that, so that the unsupported file system is mounted on the local file system structure, for example as in /MNT/FUSE.

Further, all access to /MNT/FUSE subsequently uses the FUSE bindings to access the unsupported file system. It must be noted that the files, meta-data or blocks in the unsupported file system are stored in a variety of places, such as on local network server, online on the internet, as an example S3FS, on the virtual disk inside the virtual machine image 104, in one or more files stored within the host 102 or on one or more partitions of an block storage device accessible to the host 102.

In use, the SAMBA or NFS service is initiated with configuration files such that the /MNT/FUSE is presented to the host 102 as a shared network file system. Additional parameters might be provided to the SAMBA service that will limit the set of hosts 102 to which the share is exported. Besides, the unmodified SAMBA service interacts with what appears to it as a standard POSIX file system. These requests are passed to the FUSE code, which maps the request to the appropriate action against the unsupported file system.

In some embodiments, LINUX is used as an operating system that operates within the virtual machine. Here, the unsupported storage container 108 is located in online storage. By way of example, and in no way limiting the scope of the invention, the unsupported storage container 108 is located on a service like AMAZON S3 or similar. Typically, the unsupported storage container is a monolithic file containing the blocks. However, in the current embodiment the storage container is maintained as a multitude of "allocation units", say chunks that are 128 KB in size. These chunks are compressed and/or encrypted. Those chunks that contain only zeroes are not persisted to the online store.

For example, the guest operating system 128 is a LINUX operating system running on the host 102 that is configured to run WINDOWS and the unsupported file system is the VERITAS FILE SYSTEM. The LINUX OS mounts the VERITAS FILE SYSTEM and the virtual machine 128 maps the VERITAS FILE SYSTEM onto the WINDOWS OS running on the host 102. Accordingly, the shared network file system is presented to the host 102 using SAMBA or NFS file serving services supported by the LINUX OS.

A virtual appliance refers to one or more embodiments of the virtual machine image 104 designed to run under PARALLELS, VMWARE, XEN, MICROSOFT VIRTUAL PC, QEMU, USERMODE LINUX, COLINUX, VIRTUAL IRON, VIRTUALBOX or other virtualization technologies. The virtual appliances are a subset of the broader class of software appliances. Like software appliances, virtual appliances eliminate the installation, configuration and maintenance costs associated with running complex stacks of software. A key concept that differentiates the virtual appliance from a virtual machine is that the virtual appliance is a fully pre-installed and pre-configured application and operating system environment whereas a virtual machine is, by itself, without application software. Typically, the virtual appliance has a web interface. The virtual appliance is usually built to host a single application, and so represents a new way of deploying network applications.

Generally, the virtual appliance is a preconfigured virtual machine set up to perform a specific task, such as making a plurality of files scattered across one or more of the data storage containers 108 and/or 110. In one embodiment, the virtual appliance maps the unsupported file system onto the host operating system 118 and generates the shared network file system.

Typically, virtualization aims to improve computer security and reliability by encapsulating applications from the physical hardware, operating system, and programs launched by them. When an application is launched the virtual appliance includes the application by executing the code and feeding it to the system with access rules. This is different from software having direct access to the CPU, system hardware etc.

Virtualizing an application isolates it from the other software on a user machine, and eliminates the risk of that application interfering with other programs, files and registry settings. Specifically, virtualizing an application means abstracting it from user devices as completely as possible. For example, enabling the user to interact with the application without actually installing it on the user computer or abstracting the interface.

Still certain other embodiments disclosed herein describe the virtual machine management. It must be noted that in order to start the virtual machine, the wrapper application 120 running on the host 102 discovers which operating system is running on and which virtualization technology is available. Although QEMU is used herein as the virtualization technology. However, by way of example and not limitation, other major virtualization solutions that are supported include VMWARE, VIRTUAL PC, PARALLELS, VIRTUALBOX, KVM, and the more.

Alternatively, if the wrapper application 120 finds no available virtualization technology, then the operating system specific version of QEMU is started by the wrapper application 120. Alternatively, if the virtualization technology is running and available, the wrapper application 120 instructs the virtualization technology to start the virtual machine. The virtual machine is up and running. The wrapper application 116 mounts the SAMBA or CIFS or NFS share on the host 102 or ties the iSCSI driver to the virtual appliance IP address in case it is exporting the unsupported storage container.

In certain embodiments, the wrapper application 120 is optionally protected by username/password, encryption or other security methods to make sure only authorized users access the unsupported file system or storage container. In addition, this wrapper application 120 is also capable of providing certain parameter values to the VM image (either before boot, during boot or afterwards). The wrapper application 120 is capable of starting and stopping any applications executed by the virtual machine. By virtue of this feature, assortment of management related functions, such as controlling the cache size, starting a backup or snapshot or changing the properties of the unsupported storage container 108, and the like, can be performed. Further, the wrapper application 120 changes the configuration files to modify the virtual machine 104 on the local storage device before starting the virtual machine image 104 at rest. Several methods to mount the virtual machine image 104 while resting on disk are known and can be used to change the virtual machine image 104.

In some embodiments, the virtual machine is capable of running on top of the same hypervisor on which the host 102 is running, in case one is available. Alternatively, in some other embodiments the virtual machine runs on the host using any known virtual machine technology, such as QEMU, PARALLELS, VMWARE, VIRTUALBOX, VIRTUAL PC, and the like. Yet in some other embodiments, a tool takes the virtual machine 104 created for one virtualization solution and automatically converts it to any other virtualization solution, optionally going via an intermediate format for interoperability. This implies that only one virtual machine image is created. Quality analysis (QA) is performed on the created virtual machine image and this quality analyzed virtual machine image is automatically converted into any other virtualization technology image. For example, in VMWARE a set of services, VMWARE-TOOLS runs inside the virtual machine thereby improving the performance. It must be noted that the wrapper application 120 knows which virtualization platform is used. Depending on this knowledge, the wrapper application 120 starts correct version of these performance enhancement services if needed and present.

Figure 2:
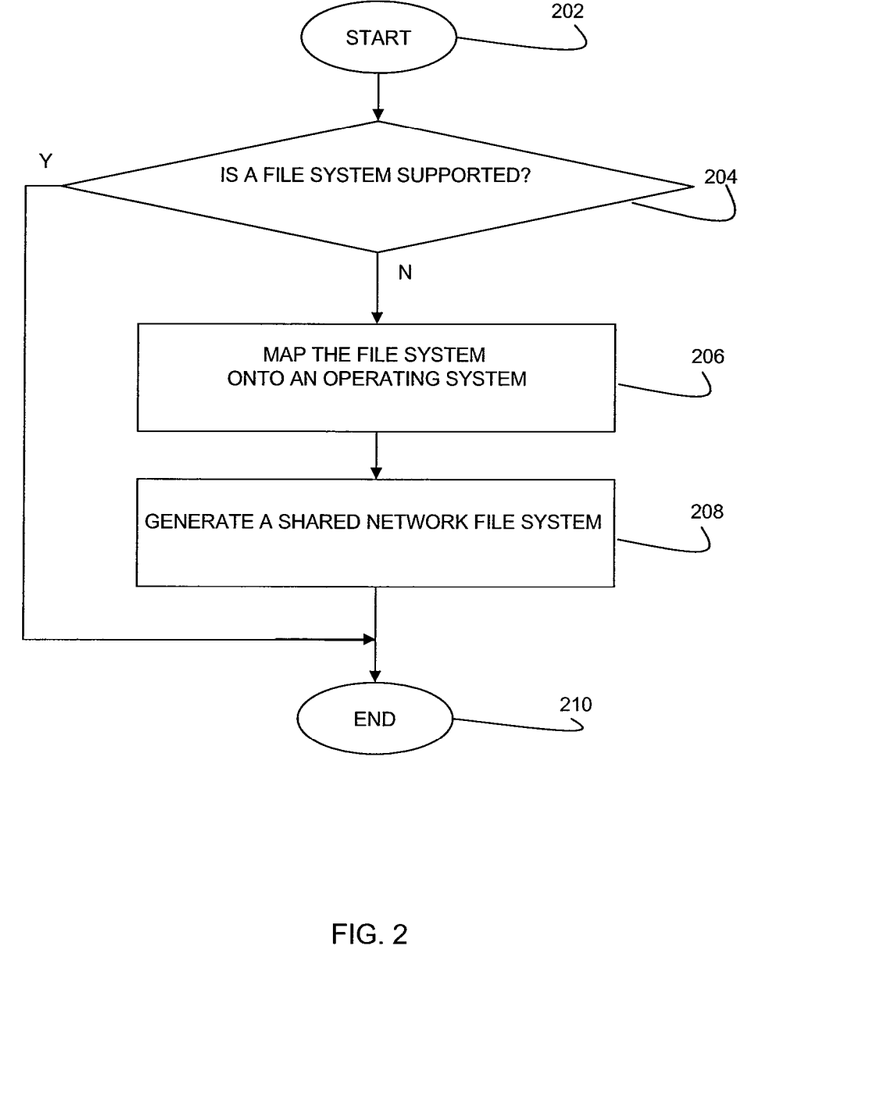
FIG. 2 depicts a flow diagram of various embodiments of a method for providing access to data in an unsupported file system in accordance with at least one embodiment of the present invention.

FIG. 2 is a flowchart depicting an embodiment of a method for providing access to data in an unsupported file system in accordance with at least one embodiment of the present invention. The method 200 starts at step 202 and proceeds to step 204. At step 204, the method 200 determines whether a file system is supported by an operating system.

If the method 200 determines in step 204 that the file system is not supported (or unsupported) by the host operating system, the method 200 proceeds to step 206. For example, if dedicated file system drivers have not been written for the file system, the file system is an unsupported file system.

At step 206, the method 200 maps the file system onto the operating system. In certain embodiments, the task of mapping involves mapping the unsupported file system to the synthesized file system supported by the given operating system, as described above. In certain other embodiments, the task of mapping involves mapping between an access function of the unsupported file system to an access function of the supported synthesized file system. Yet in certain other embodiments, the task of mapping involves mapping a request from the operating system onto an operation on a file system.

Still in some other embodiments, the file system is mapped onto a block structure. This is performed by creating meta-data for a volume mounted by the file system. Here, the volume mounted by the file system is presented as a synthetic block device.

At step 208, the method 200 generates a shared network file system. In certain embodiments, the shared network file system is coupled to the host operating system within the host 102. If the method 200 determines in step 204 that the file system is supported by the operating system, the method 200 proceeds to step 210. The method 200 ends at step 210.

Figure 3:
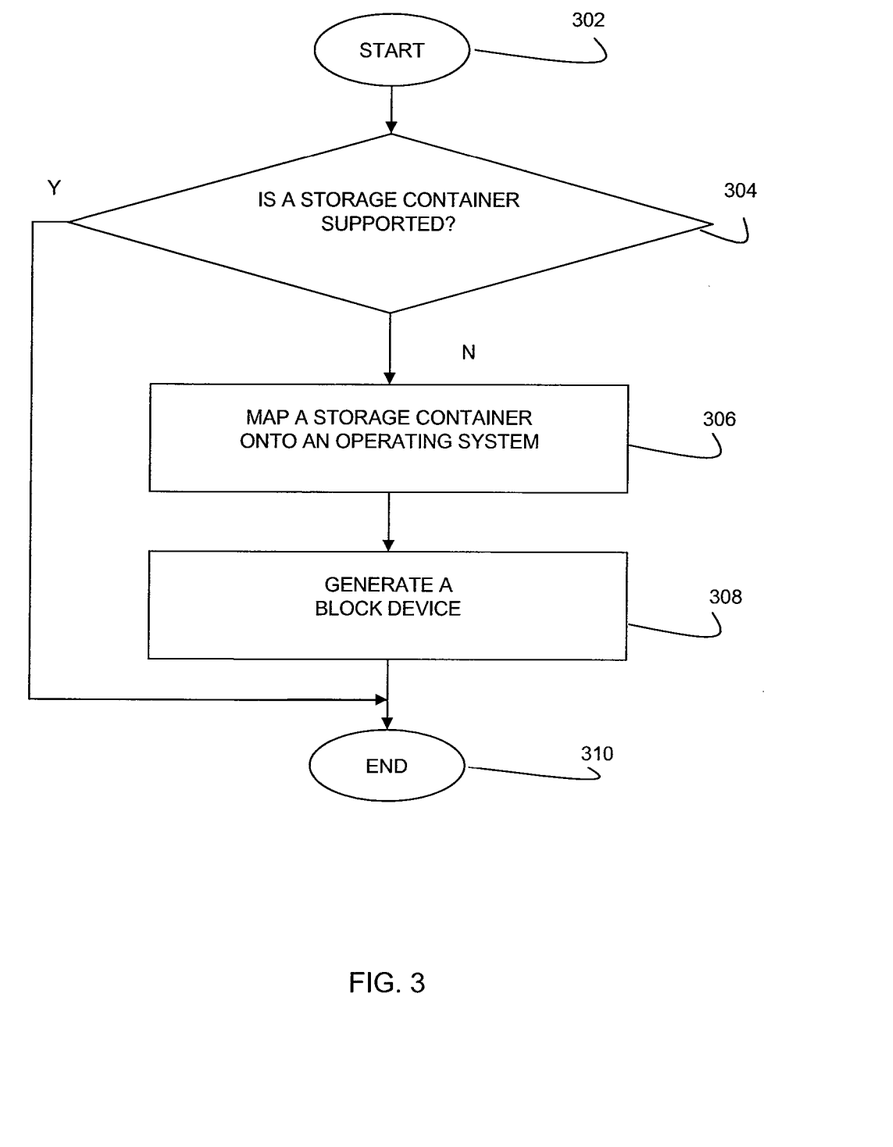
FIG. 3 depicts a flow diagram of various embodiments of a method for providing access to data in an unsupported storage container in accordance with at least one embodiment of the present invention.

FIG. 3 depicts a flowchart for a method for providing access to data in an unsupported storage container in accordance with at least one embodiment of the present invention. The method 300 starts at step 302 and proceeds to step 304. At step 304, the method 300 determines whether a storage container is supported by an operating system.

If the method 300 determines in step 304 that the storage container is not supported by the operating system, the method 300 proceeds to step 306. For example, if dedicated device drivers have not been written for the storage container, the storage container is an unsupported storage container.

At step 306, the method 300 maps the unsupported storage container onto the operating system. In one certain embodiment, the unsupported storage container is mapped onto a synthesized on-disk structure (e.g., file system) supported by the given operating system.

At step 308, the method 300 generates a block device accessible by the operating system. In some embodiments, the block device is coupled to the operating system on the host. Here, the block device is bound to a file system driver or a block device driver associated with the operating system.

If the method 300 determines in step 304 that the given storage container is supported by the operating system 112, the method 300 proceeds to step 310. The method 300 ends at step 310.

Figure 4:
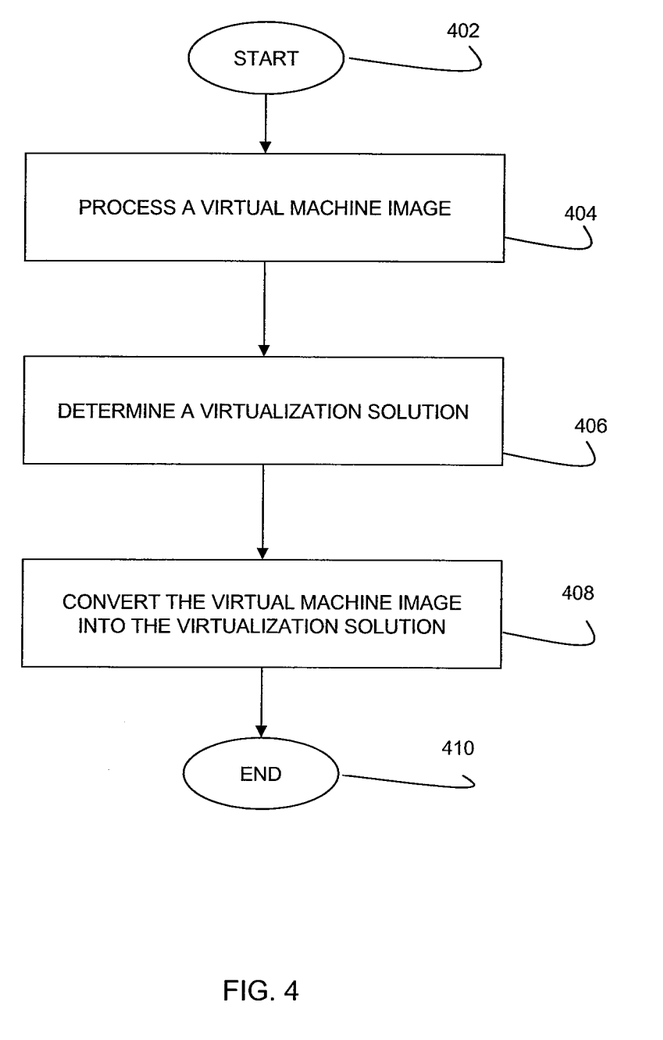
FIG. 4 depicts a flow diagram of various embodiments of a method for providing access to data performed by a virtual machine on execution of a wrapper application in accordance with at least one embodiment of the present invention.

FIG. 4 depicts a flowchart for a method for an exemplary embodiment of providing access to data performed by a virtual machine on execution of the wrapper application in accordance with at least one embodiment of the present invention. The method 400 starts at step 402 and proceeds to step 404. At step 404, the method 400 involves the task of processing the virtual machine image. A virtual machine is created from launching a virtual machine image. A host-supported file system is mounted using the virtual machine.

At step 406, the method 400 determines whether a virtualization solution is operable by a host. At step 408, the method 400 converts the virtual machine image into the virtualization solution where the virtualization solution is recognized by the host. The method 400 ends at step 410.

As used in the current context, the term "virtualization" refers to integration of one or more back end services or functions with additional front end functionality for the purpose of providing useful abstractions. Typically virtualization hides some of the back end complexity, or adds/integrates new functionality with existing back end services. Examples of virtualization are the aggregation of multiple instances of a service into one virtualized service, or to add security to an otherwise insecure service. Virtualization can be nested or applied to multiple layers of a system.

Virtualization when implemented in file system is file system virtualization. The act of aggregating multiple file systems into one large virtual file system is referred to as file system virtualization. It may be noted that users access data objects through the virtual file system and are thus unaware of the underlying partitioning. Stated differently, file system virtualization is the act of providing additional new or different functionality, such as a different file access protocol, on top of one or more existing file systems.

Virtualization when implemented in block devices is block virtualization. This is the act of applying virtualization to one or more block based storage services for the purpose of providing a new aggregated, high level, rich, simple, secure, and the more, block service to clients. Block virtualization functions can be nested. For example, disk drives, RAID systems or volume managers all perform some form of block address to (different) block address mapping or aggregation.

The term "virtualization solution (VS)", as used herein refers to solution that allows applications and data to be put into virtual layers, such as application and data layers, instead of being installed to the base file system and registry. This is achieved through the use of a filter driver and layering technology. Virtualization solution offers an approach for managing applications that works regardless of whether the applications reside on stand-alone or networked computers. For example, by placing applications and data into managed units called VIRTUAL SOFTWARE PACKAGES (VSPs), ALTIRIS SOFTWARE VIRTUALIZATION SOLUTION (SVS) allows elimination of intractable problems of application management. Although QEMU is used herein as the virtualization technology. However, by way of example and not limitation, other major virtualization solutions that are supported by the present invention include VMWARE, VIRTUAL PC, PARALLELS, VIRTUALBOX, KVM, and the more.

The invention is intended to cover equivalent embodiments, and is limited only by the appended claims. Various other embodiments are possible within the spirit and scope of the invention. While the invention may be susceptible to various modifications and alternative forms, the specific embodiments have been shown by way of example in the drawings and have been described in detail herein. The aforementioned specific embodiments are meant to be for explanatory purposes only, and not intended to delimit the scope of the invention. Rather, the invention is to cover all modifications, equivalents, and alternatives falling within the spirit and scope of the invention as defined by the following appended claims.

What is claimed is:

1. A computer implemented method for accessing unsupported file systems communicatively coupled to a host operating system and unsupported by the host operating system, the method comprising:

determining that a file system communicatively coupled to the host operating system is unsupported by the host operating system, responsive to the host operating system not having a file system driver written for the host operating system to access the file system;

determining that the file system is unsupported by a guest operating system running on a virtual machine which is communicatively coupled to the host operating system and the file system, responsive to the guest operating system not having a file system driver written for the guest operating system to access the file system;

responsive to determining that the file system is unsupported by the guest and host operating systems, using an application running on the virtual machine to create a synthesized file system from the unsupported file system, wherein creating the synthesized file system further comprises mapping the unsupported file system to a synthetic block device on the guest operating system, and translating block read/write commands from the host operating system to appropriate actions on the unsupported file system such that the application running on the virtual machine serves as an intermediate between the host operating system and the unsupported file system; and accessing the synthesized file system via the application running on the virtual machine.

2. The method of claim 1, wherein mapping the unsupported file system onto the synthesized file system further comprises mapping access functions from the unsupported file system to access functions on the synthesized file system.

3. The method of claim 1, wherein creating the synthesized file system from the unsupported file system further comprises:

mapping the unsupported file system onto a block structure by creating meta-data for a volume mounted by the unsupported file system, and presenting the volume as a block device.

4. The method of claim 1, wherein mapping the unsupported file system onto the synthesized file system further comprises mapping requests from the host operating system onto the synthesized file system.

5. The method of claim 4, wherein mapping the unsupported file system onto the synthesized file system further comprises communicatively coupling the host operating system to a shared network file system wherein the shared network file system is generated by the virtual machine, and wherein the shared network file system is accessible by the host operating system using file serving services.

6. The method of claim 1, wherein mapping the unsupported file system onto the synthesized file system further comprises:

bridging the unsupported file system to the host operating system, wherein the bridging comprises creating a modified file server, and the modified file server is based on one of:

a network file system (NFS), a common internet file system (CIFS), or a direct access file system (DAFS).

7. A computer implemented method for providing access to unsupported storage containers communicatively coupled to a host operating system and unsupported by the host operating system, the method comprising:

determining that a storage container communicatively coupled to the host operating system is unsupported by the host operating system, responsive to the host operating system not having a driver written for the host operating system to access the storage container;

determining that the storage container is unsupported by a guest operating system running on a virtual machine which is communicatively coupled to the host operating system and the storage container, responsive to the guest operating system not having a driver written for the guest operating system to access the storage container;

responsive to determining that the storage container is unsupported by the guest and host operating systems, using a virtual machine application to create a synthetic storage container from the unsupported storage container, wherein creating the synthetic storage container further comprises mapping the unsupported storage container to a synthetic block device on the guest operating system, and translating block read/write commands from the host operating system to appropriate actions on the unsupported storage container such that the virtual machine application serves as an intermediate between the host operating system and the unsupported storage container; and accessing the synthetic storage container using block protocol and at least one block target driver wherein the at least one block target driver communicates requests from the host operating system to the synthetic storage container.

8. The method of claim 7, wherein creating a synthetic storage container further comprises:

mapping an on-disk structure, within the storage container, onto a block structure by creating meta-data for a volume representing the storage container, and presenting the volume as the block device.

9. The method of claim 8, wherein presenting the block device accessible by the host operating system comprises:

associating the block device with a block target driver, wherein the block target driver is used by the host operating system to communicate block level operations to the block device.

* * * * *